United States Patent
Scheevel et al.

(10) Patent No.: US 8,364,719 B2
(45) Date of Patent: *Jan. 29, 2013

(54) OBJECT BASED CONTENT MANAGEMENT SYSTEM AND METHOD

(75) Inventors: Mark R. Scheevel, Austin, TX (US);
Timothy A. Ozor, Austin, TX (US);
Greg Hilton, Austin, TX (US); Jeffrey M. Collins, Austin, TX (US)

(73) Assignee: Open Text S.A., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 13/085,362

(22) Filed: Apr. 12, 2011

(65) Prior Publication Data

US 2011/0196823 A1 Aug. 11, 2011

Related U.S. Application Data

(63) Continuation of application No. 10/434,935, filed on May 9, 2003, now Pat. No. 7,941,453.

(51) Int. Cl.
*G06F 17/30* (2006.01)

(52) U.S. Cl. ........................................................ 707/802

(58) Field of Classification Search .................. None
See application file for complete search history.

(56) References Cited

U.S. PATENT DOCUMENTS

| | | | |
|---|---|---|---|
| 5,418,888 A | | 5/1995 | Alden |
| 5,615,362 A | * | 3/1997 | Jensen et al. ........................ 1/1 |
| 5,634,124 A | | 5/1997 | Khoyi et al. |
| 5,806,066 A | | 9/1998 | Golshani et al. |
| 5,930,154 A | * | 7/1999 | Thalhammer-Reyero ...... 703/11 |
| 6,006,234 A | | 12/1999 | Govindarajan et al. |
| 6,052,691 A | | 4/2000 | Ardoin et al. |
| 6,065,011 A | | 5/2000 | Bulusu et al. |
| 6,233,730 B1 | | 5/2001 | Todd et al. |
| 6,292,804 B1 | | 9/2001 | Ardoin et al. |
| 6,353,860 B1 | | 3/2002 | Hare et al. |
| 6,477,628 B1 | | 11/2002 | Bish |
| 6,490,255 B1 | | 12/2002 | Kiriha et al. |
| 6,772,168 B2 | | 8/2004 | Ardoin et al. |
| 6,795,848 B1 | | 9/2004 | Border et al. |
| 6,834,382 B2 | | 12/2004 | Marso et al. |
| 6,857,053 B2 | | 2/2005 | Bolik et al. |
| 6,904,460 B1 | | 6/2005 | Raciborski et al. |
| 6,910,040 B2 | | 6/2005 | Emmick et al. |
| 6,938,260 B1 | | 8/2005 | Wason |
| 6,965,872 B1 | | 11/2005 | Grdina |
| 7,092,955 B2 | | 8/2006 | Mah et al. |
| 7,096,216 B2 | | 8/2006 | Anonsen |
| 7,213,062 B1 | | 5/2007 | Raciborski et al. |
| 7,249,197 B1 | | 7/2007 | Roestenburg et al. |

(Continued)

OTHER PUBLICATIONS

"The Castor Project," Feb. 12, 2003, ExoLab Group, 1999-2003, pp. 1-3, at www.exolab.org, printed Feb. 24, 2003.

(Continued)

*Primary Examiner* — Hung Q Pham
*Assistant Examiner* — Hubert Cheung
(74) *Attorney, Agent, or Firm* — Sprinkle IP Law Group

(57) ABSTRACT

A method and system disclosed herein can be used to determine relationships between objects, determining which of those relationships are significant for a specific action, and determining physical dependencies between the objects. The method and system can be used to perform actions consistent with integrity constraints, and therefore, performs the actions in the correct order with a reduced likelihood of errors. The method and system are highly beneficial in that they can significantly enhance content management and can be implemented without having to write new or edit existing applications. Also, existing content data and applications may be used without any changes.

20 Claims, 5 Drawing Sheets

U.S. PATENT DOCUMENTS

| | | | |
|---|---|---|---|
| 7,290,007 B2 | 10/2007 | Farber et al. | |
| 7,299,270 B2 * | 11/2007 | Kolluri et al. | 709/218 |
| 7,428,723 B2 | 9/2008 | Greene et al. | |
| 7,464,385 B1 | 12/2008 | Ozor et al. | |
| 7,680,818 B1 | 3/2010 | Fan et al. | |
| 7,908,608 B2 | 3/2011 | Ozor et al. | |
| 7,941,453 B1 | 5/2011 | Scheevel et al. | |
| 8,051,102 B2 * | 11/2011 | Everett | 707/793 |
| 2001/0029604 A1 | 10/2001 | Dreyband et al. | |
| 2001/0049732 A1 | 12/2001 | Raciborski et al. | |
| 2001/0051980 A1 | 12/2001 | Raciborski et al. | |
| 2001/0054095 A1 | 12/2001 | Kampe et al. | |
| 2002/0055966 A1 | 5/2002 | Border et al. | |
| 2002/0099684 A1 | 7/2002 | Ardoin et al. | |
| 2002/0194201 A1 | 12/2002 | Wilbanks et al. | |
| 2003/0018616 A1 | 1/2003 | Wilbanks et al. | |
| 2003/0101286 A1 * | 5/2003 | Kolluri et al. | 709/316 |
| 2003/0110448 A1 | 6/2003 | Haut et al. | |
| 2003/0185432 A1 | 10/2003 | Hong et al. | |
| 2003/0195885 A1 * | 10/2003 | Emmick et al. | 707/8 |
| 2004/0015487 A1 | 1/2004 | Lin et al. | |
| 2004/0024790 A1 * | 2/2004 | Everett | 707/200 |
| 2004/0093331 A1 * | 5/2004 | Garner et al. | 707/3 |
| 2004/0205493 A1 | 10/2004 | Simpson et al. | |
| 2006/0265257 A1 | 11/2006 | Pulfer | |

OTHER PUBLICATIONS

Toplink increases developer productivity and accelerator application performance by providing the integration between Java applications and relational data, WebGain, Inc., Santa Clara, CA, 2000-2002, 1 pg. at http://www.webgain.com/products/toplink, printed Feb. 24, 2003.

Toplink, Version 4.0, 2001, 23 pages, WebGain, Inc., Santa Clara, CA.

Office Action for U.S. Appl. No. 10/434,935, mailed May 29, 2007, 11 pgs.

Office Action for U.S. Appl. No. 10/434,935, mailed Nov. 16, 2007, 18 pgs.

Office Action for U.S. Appl. No. 10/434,935, mailed Apr. 14, 2008, 19 pgs.

Office Action for U.S. Appl. No. 10/434,935, mailed Oct. 1, 2008, 22 pgs.

Office Action for U.S. Appl. No. 10/434,935, mailed Mar. 2, 2009, 22 pgs.

Office Action for U.S. Appl. No. 10/434,935, mailed Sep. 11, 2009, 12 pgs.

Office Action for U.S. Appl. No. 10/434,935, mailed Jan. 29, 2010, 17 pages.

Office Action for U.S. Appl. No. 10/434,935, mailed Aug. 12, 2010, 15 pgs.

Office Action for U.S. Appl. No. 10/434,937, mailed Mar. 19, 2007, 10 pgs.

Office Action for U.S. Appl. No. 10/434,937, mailed Apr. 8, 2008, 9 pgs.

Office Action for U.S. Appl. No. 12/272,139, mailed Jun. 17, 2010, 11 pgs.

Notice of Allowance for U.S. Appl. No. 12/272,139, mailed Nov. 10, 2010, 8 pgs.

Notice of Allowance for U.S. Appl. No. 10/434,935, mailed Jan. 19, 2011, 18 pgs.

Notice of Allowance for U.S. Appl. No. 13/046,418, mailed Nov. 10, 2011, 5 pgs.

* cited by examiner

OBJECT BASED CONTENT MANAGEMENT SYSTEM AND METHOD

CROSS-REFERENCE TO RELATED APPLICATION

This application is a continuation of U.S. patent application Ser. No. 10/434,935, filed May 9, 2003, now U.S. Pat. No. 7,941,453 now allowed, entitled "METHOD AND SYSTEM FOR DEPLOYMENT OF CONTENT USING PROXY OBJECTS," which is fully incorporated by reference herein. This application relates to U.S. patent application Ser. No. 10/434,936, filed May 9, 2003, issued as U.S. Pat. No. 7,415,484, entitled "METHOD AND SYSTEM FOR MODELING OF SYSTEM CONTENT FOR BUSINESSES," which is assigned to the current assignee hereof and incorporated herein by reference.

TECHNICAL FIELD

This disclosure relates in general to methods and systems for content delivery and management, and more particularly, to methods and systems of managing content at a network site through complex records and compound objects and their relationships and dependencies. Even more particularly, based on the relationships and dependencies, embodiments disclosed herein can determine an order of actions consistent with integrity constraints and policy considerations.

DESCRIPTION OF THE RELATED ART

Content management at web sites is becoming increasingly complicated as more content is used at those web sites. Companies are finding that managing the content is proving to be a daunting task. Site builders are moving toward database-driven sites, where pages are generated on demand. Two products that may be used with database-driven content are Castor and TopLink®. TopLink is a registered trademark owned by Oracle International Corporation of Redwood City, Calif., U.S.A.

Castor, also referred to as The Castor Project which was started and originally developed by Keith Visco and Assaf Arkin of Intalio, Inc., is an open source data-binding framework for Java® to provide a path between Java objects, eXtensible Markup Language ("XML") documents, and Structured Query Language ("SQL") tables. Java® is a registered trademark owned by Sun Microsystems, Inc. of Mountain View, Calif., U.S.A. Castor can be used to produce java objects, given some underlying persistent substrate. A distinguishing architectural feature of Castor is that it has a pluggable, underlying architecture, so it can have different persistence frameworks. A mechanism is used for describing to the Castor framework what the persistence will be.

TopLink™ provides developers with the flexibility to map objects and Enterprise Java Beans ("EJBs") to a relational database schema. Effectively, TopLink™ is an object relational bridge. The basic idea is that an object-oriented model of data is provided, and then the object-oriented model gets transformed into a purely relational model. More specifically, TopLink™ can take the object-oriented model and map it onto relational tables.

A need exists for a new generation of content management software that is "backwards compatible." That is, content management software that can be used without having to re-write existing applications or changing pre-existing data at a network site.

SUMMARY OF THE DISCLOSURE

A method and system can be used to manage content using complex records and compound objects. The method and system can be used to determine relationships between objects, determine which of those relationships are significant for a specific action, and determine physical dependencies between the objects. The method and system can be used to perform actions consistent with integrity constraints, and therefore, performs the actions in the correct order with a reduced likelihood of errors. The method and system are highly beneficial in that they can significantly enhance content management and can be implemented without having to write new or edit existing applications. Also, existing content data may be used without any changes.

In one set of embodiments, the method of using content at a network site can comprise determining a relationship between an object and other data that is referenced by or references the object. The object and other data may be managed by a content manager software component. The method can also comprise determining an order in which an action is to be performed on the object and the other data based upon a physical dependency between the object and the other data. The method can further comprise performing an action on the object and other data in response to determining the order.

In another set of embodiments, a data processing system readable medium can have code embodied therein. The code can comprise an instruction for reading information for a content type and an instruction for generating a structured definition of the content type using the information.

The foregoing general description and the following detailed description are exemplary and explanatory only and are not restrictive of the disclosure, as defined in the appended claims.

BRIEF DESCRIPTION OF THE DRAWINGS

The present disclosure is illustrated by way of example and not limitation in the accompanying figures.

Figure 1:
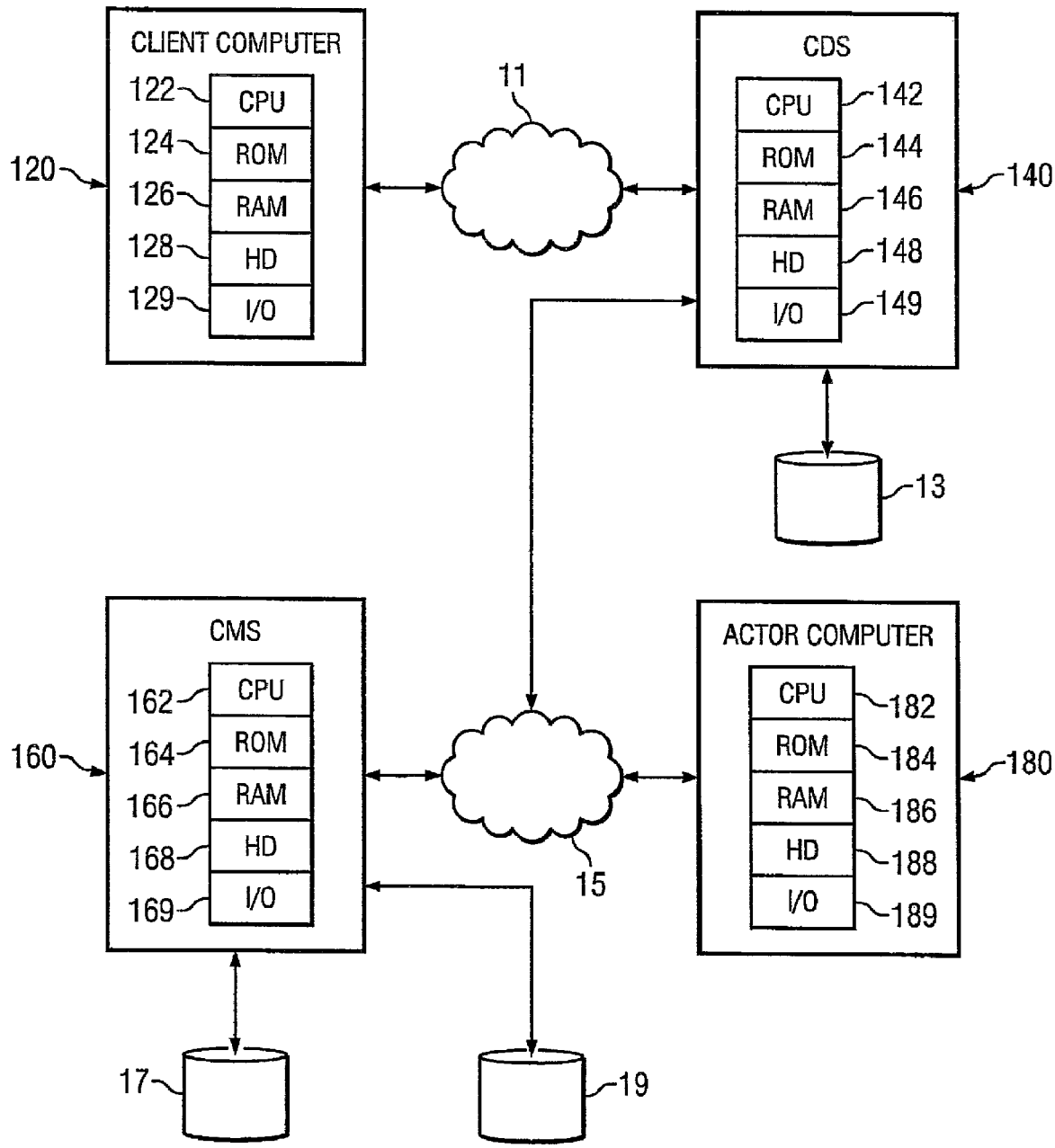
FIG. 1 includes an illustration of a hardware configuration of a network for using content in accordance with a specific, non-limiting embodiment of the present disclosure.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION

Reference is now made in detail to the exemplary embodiments of the disclosure, examples of which are illustrated in the accompanying drawings. Wherever possible, the same reference numbers will be used throughout the drawings to refer to the same or like parts (elements).

A method and system can be used to manage content using complex records and compound objects. The method and system can be used to determine relationships between objects, determine which of those relationships are significant for a specific action, and determine physical dependencies between the objects. The method and system can be used to perform actions consistent with integrity constraints, and therefore, performs the actions in the correct order with a reduced likelihood of errors. The method and system are highly beneficial in that they can significantly enhance content management and can be implemented without having to write new or edit existing applications. Also, existing content data may be used without any changes.

A few terms are defined or clarified to aid in understanding the descriptions that follow. A network includes an interconnected set of server and client computers over a publicly available medium (e.g., the Internet) or over an internal (company-owned) system. A user at a client computer may gain access to the network using a network access provider. An Internet Service Provider ("ISP") is a common type of network access provider.

The term "complex record" is intended to mean a single logical entity that may comprise more than one row in more than one table within a database.

The term "software component" is intended to mean at least a portion of a computer program (i.e., a software application). Examples include a content delivery software component, a content management software component, or the like. Different software components may reside in the same computer program or in different computer programs on the same computer or different computers.

As used herein, the terms "comprises," "comprising," "includes," "including," "has," "having" or any other variation thereof, are intended to cover a non-exclusive inclusion. For example, a method, process, article, or apparatus that comprises a list of elements is not necessarily limited to only those elements but may include other elements not expressly listed or inherent to such method, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Before discussing embodiments of the present disclosure, an exemplary hardware architecture for using embodiments of the present disclosure is described. FIG. 1 illustrates an exemplary architecture and includes external network 11 that can be bi-directionally coupled to client computer 120 and content delivery system ("CDS") 140. CDS 140 can be bi-directionally coupled to database 13. An internal network 15 can be bi-directionally coupled to CDS 140, content management system ("CMS") 160, and actor computer 180. CMS 160 can be bi-directionally coupled to databases 17 and 19, each of which may contain data objects and metadata regarding those objects in tables within those databases. CDS 140, CMS 160, and databases 13, 17, and 19 may be part of a network site. Note that FIG. 1 is a simplification of a hardware configuration.

Within each of CDS 140 and CMS 160, a plurality of computers (not shown) may be interconnected to each other over internal network 15 or a combination of internal and external networks. For simplification, a single system is shown for each of CDS 140 and CMS 160. Other systems (e.g., page generator, application server, etc.) may be part of CDS 140, CMS 160, or additional systems that are bi-directionally coupled to the internal network 15.

A plurality of other client computers 120 may be bi-directionally coupled to external network 11, and a plurality of actor computers 180 may be coupled to internal network 15. Actor computers 180 may include personal computers or workstations for individuals that use internal network 15. These individuals may include content developers, editors, content reviewers, webmasters, information technology specialists, and the like. Many other alternative configurations are possible and known to skilled artisans.

Client computer 120 can include central processing unit ("CPU") 122, read-only memory ("ROM") 124, random access memory ("RAM") 126, hard drive ("HD") or storage memory 128, and input/output device(s) ("I/O") 129. I/O 129 can include a keyboard, monitor, printer, electronic pointing device (e.g., mouse, trackball, etc.), or the like. Client computer 120 can include a desktop computer, a laptop computer, a personal digital assistant, a cellular phone, or nearly other device capable of communicating over a network. Actor computer 180 may be similar to client computer 120 and can comprise CPU 182, ROM 184, RAM 186, HD 188, and I/O 189.

CDS 140 can include a server computer comprising CPU 142, ROM 144, RAM 146, HD 148, and I/O 149, and CMS 160 can include a server computer comprising CPU 162, ROM 164, RAM 166, HD 168, and I/O 169. CDS 140 or CMS 160 may have one or more of a content delivery software component, a page generator software component, the content management software component, an applications software component, and the like.

Each of the computers in FIG. 1 may have more than one CPU, ROM, RAM, HD, I/O, or other hardware components. For simplicity, each computer is illustrated as having one of each of the hardware components, even if more than one is used. The content and its metadata, if any, may be located within any or all of CDS 140, CMS 160, and databases 13, 17, and 19. During staging, a user at actor computer 180 may have access to proxy objects for the content. After staging, data objects may be copied into database 13 via CDS 140, so that the data object may be accessed quicker by CDS 140 to respond to requests from client computer 120. Another advantage is that this separation of content items and proxies allows CDS 140 to deliver one version of a content item (or collection of content items) while the "original" undergoes modification in CMS 160.

Each of computers 120, 140, 160, and 180 is an example of a data processing system. ROM 124, 144, 164, and 184; RAM 126, 146, 166, and 186; HD 128, 148, 168, and 188; and databases 13, 17, and 19 can include media that can be read by CPU 122, 142, 162, or 182. Therefore, each of these types of memories includes a data processing system readable medium. These memories may be internal or external to computers 120, 140, 160, or 180.

Figure 2:
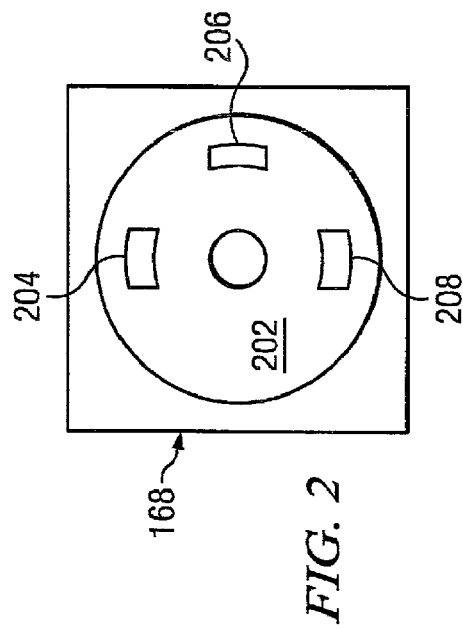
FIG. 2 includes an illustration of a data processing system storage medium including software code having instructions in accordance with an embodiment of the present disclosure.

Portions of the methods described herein may be implemented in suitable software code that may reside within ROM 124, 144, 164, or 184, RAM 126, 146, 166, or 186, or HD 128, 148, 168, or 188. In addition to those types of memories, the instructions in an embodiment of the present disclosure may be contained on a data storage device with a different data processing system readable storage medium, such as a hard disk. FIG. 2 illustrates a combination of software code elements 204, 206, and 208 that are embodied within a data processing system readable medium 202, on HD 168. Alternatively, the instructions may be stored as software code elements on a DASD array, magnetic tape, floppy diskette, optical storage device, or other appropriate data processing system readable medium or storage device.

In an illustrative embodiment of the disclosure, the computer-executable instructions may be lines of compiled C++, Java, or other language code. Other architectures may be used. For example, the functions of any one of the computers may be performed by a different computer shown in FIG. 1. Additionally, a computer program or its software components with such code may be embodied in more than one data processing system readable medium in more than one computer.

In the hardware configuration above, the various software components (e.g., content delivery, page generator, content management, or the like) may reside on a single server computer or on any combination of separate server computers. In alternative embodiments, some or all of the software components may reside on the same server computer. For example, the content delivery software component and the page generator software component could reside on the same server computer.

Communications between any of the computers in FIG. 1 can be accomplished using electronic, optical, radio-frequency, or other signals. For example, when a user is at client computer 120, client computer 120 may convert the signals to a human understandable form when sending a communication to the user and may convert input from a human to appropriate electronic, optical, radio-frequency, or other signals to be used by client computer 120, systems 140 or 160, or actor computer 180. Similarly, when an operator is at CMS 160, its server computer may convert the signals to a human understandable form when sending a communication to the operator and may convert input from a human to appropriate electronic, optical, radio-frequency, or other signals to be used by computers 120 or 180 or systems 140 or 160.

Figure 3:
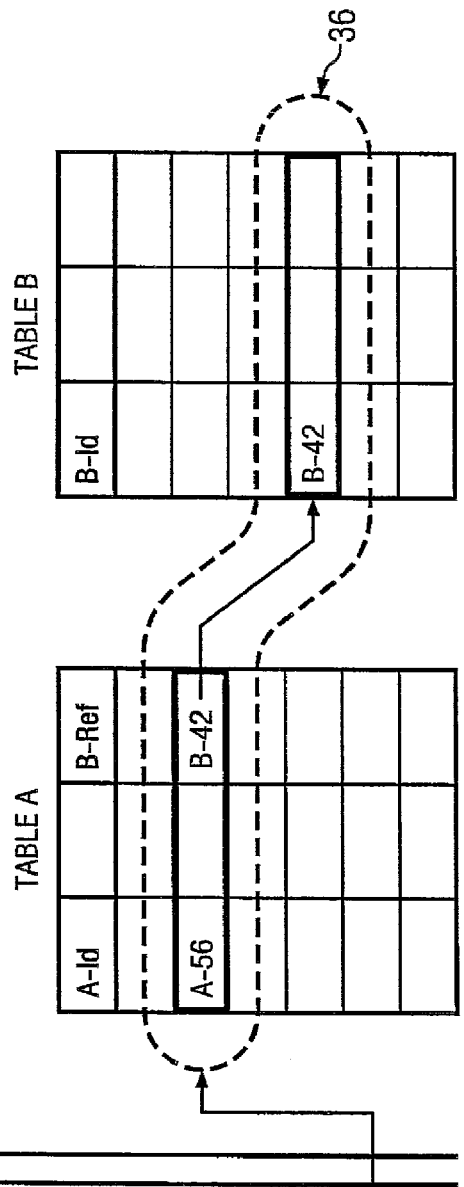
FIG. 3 includes an illustration of a complex record.

Before addressing the methodology, an exemplary organization of data is presented. Note that system metadata 32 on the CMS side is separated from customer content data 34 as shown in FIG. 3. This allows system metadata 32, which CMS 160 uses, to be located in separate tables. The separation is illustrated in FIG. 3 by the double lines The separation makes it possible to introduce a new content management system into an environment with a pre-existing data model (and data) without requiring that the customer make any changes to that model.

FIG. 3 also illustrates a complex record 36. On the CMS side of the double line, object "Obj-14" can be manipulated, but the object is the proxy for all of the related content rows (in this example, the rows keyed by A-56 and B-42). When Obj-14 is deployed to a stage, the two content rows can be deployed to that stage's content database. One of the purposes of content types is to provide a description that allows CMS 160 to understand the relationships among the content tables and rows. In this case, the content type (not shown) for the logical instance can inform CMS 160 that every row from Table A references a row from Table B via the foreign key reference in Table A's B-Ref column.

Figure 4:
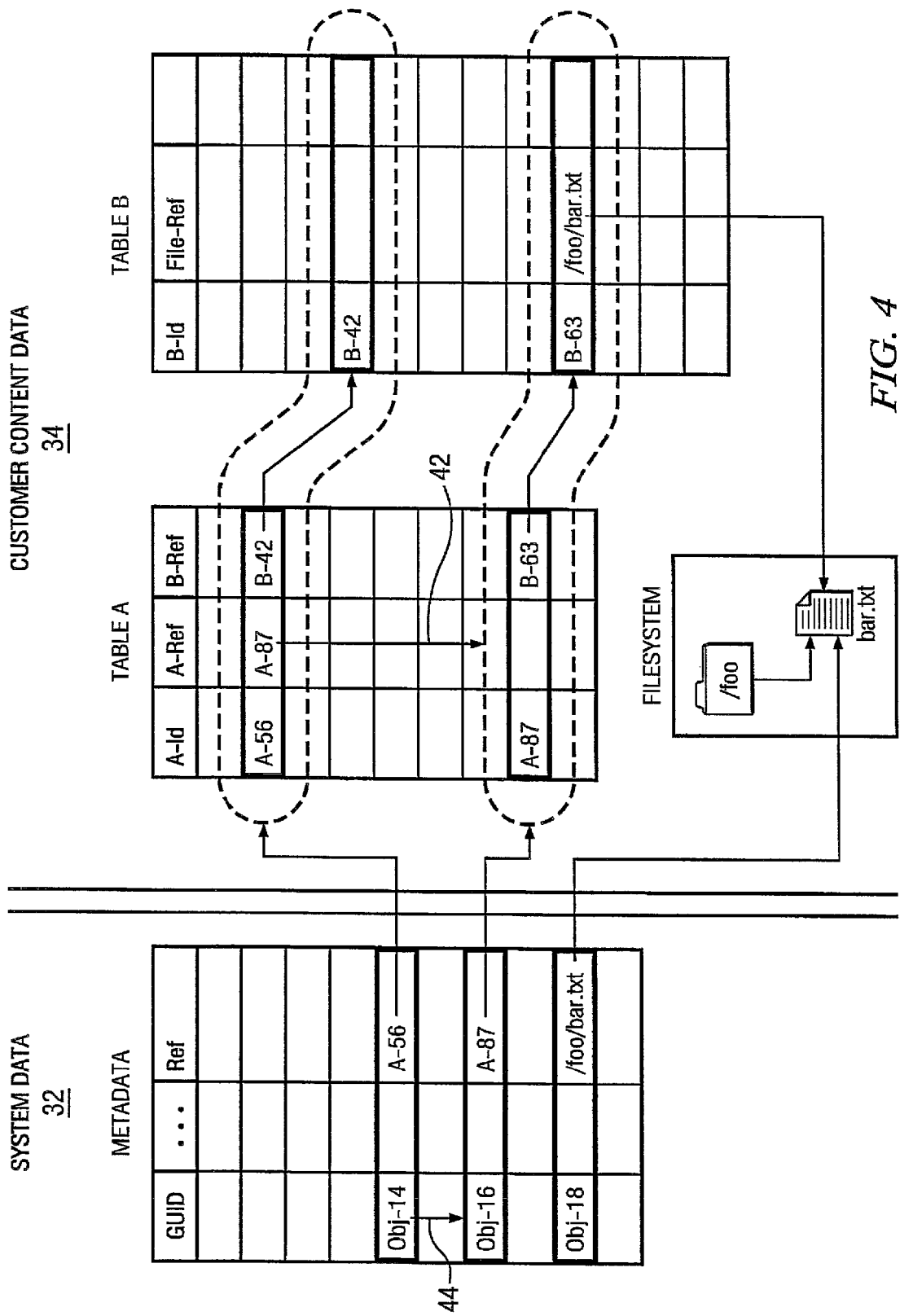
FIG. 4 includes an illustration showing how relationships between complex records can be used to infer relationships between proxy objects.

FIG. 4 illustrates a concept referred to as compound objects. Obj-14 and Obj-16 are proxy objects that each include complex records. A descriptive mechanism (e.g., the content type) notes that the A-Ref column in table A contains foreign key values that identify other rows in table A. The difference from the complex record 36 in FIG. 3 is that the identified rows are not considered part of the referencing object. Instead, they identify a primary row of another object. That information (illustrated by arrow 42) can be used to infer a parallel relationship (illustrated by arrow 44) between the two proxy objects (Obj-14 and Obj 16) on the metadata side of the double line.

Figure 5:
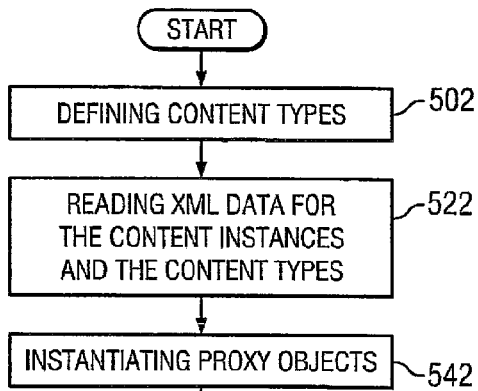
FIGS. 5-6 include a process flow diagram of a process for using content at a network site in accordance with an embodiment of the present disclosure.
Figure 6:
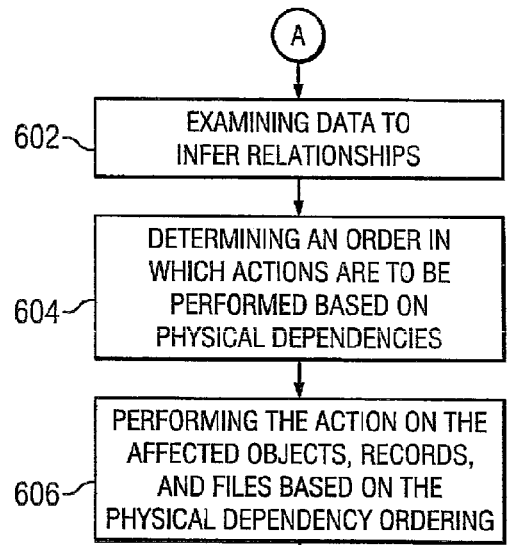

Attention is now directed to FIGS. 5-6 that include an exemplary process flow for using content at a network site. The method can comprise defining content types (block 502 in FIG. 5), reading XML data for the content instances and the content type (block 522), instantiating proxy objects (block 542), examining data to infer relationships (block 602 in FIG. 6), determining an order in which actions are to be performed upon based on physical dependencies (block 604), and performing the action on the affected objects, records, and files based on physical dependency ordering (block 606).

Note that not all of the activities described in the process flow diagram are required, that an element within a specific activity may not be required, and that further activities may be performed in addition to those illustrated. After reading this specification, skilled artisans will be capable of determining what activities can be used for their specific needs.

Before defining the content types, a user may need to understand the physical mapping of the database(s) that will be used. If the data already exists, a user may need to determine, in a reverse sense, what description that properly captures the relationships among the tables that already exist. Such information may be useful in defining the content types.

Attention is now directed to details of using content at a network site. The description will be given in conjunction with the process flow diagram in FIGS. 5-6.

Referring to FIG. 5, the method can comprise defining content types (block 502). Content types may be thought of as "recipes" for subsequently instantiated objects from those content types. The content type is used to manage instances being created from that content type. The content types can be defined to include attributes and potentially other information. A user at actor computer 180 may use a graphical user interface or other interface for defining the content type. When the content type is saved, CMS 160 automatically serializes the input to create a structure definition of the content type that may be stored in database 17 or 19. The structured definition may be in XML. Alternatively, the structured definitions may be generated in a different manner or expressed in a different language.

The content types should be defined in the proper order. More specifically, base or leaf content types should be defined before composite content types. The base or leaf content types do not refer to any other content type, whereas a composite content type refers to at least one other content type. Simply put, the base or leaf content type should exist for it to be referenced by a composite content type. The content types may include references to one or more content types. Information regarding the content types will be addressed later in this specification.

In one example, a content type of "article" can include a title, an author, an image, and text attributes. The title, image, and text may be at leaf nodes and not refer to any other objects. The author may come from an author table within database 17 or 19 and may also be a content type. Therefore, an article content type can be a composite content type because it refers to another content type, namely an author content type. The author content type should be created before the article content type to comply with referential integrity constraints.

The attributes may be used to locate referenced objects, files, and records. One of the attributes may reference a file. If so, the reference can be the file name for the file. For a record from a table in one of the databases 17 or 19, the reference can include a reference to a database and the column with primary keys for the database table.

Part of defining content types may include annotating policy information. Predefined policies may be used for deployment, promotion, demotion, packaging, and potentially other purposes may be within the annotations. CMS 160 may include business rules for acting on records, files, and objects to ensure that referential integrity constraints are met. Using the relationship and policy information, CMS 160 may determine which, if any, references are relevant for a particular purpose, as will be explained below in more detail.

Depending on the policy, different sets of data objects may be significant or insignificant to a particular data object based on the action being considered. Deployment of a proxy object may affect one set of the other data objects (objects lower in the hierarchy or closer to the leaf nodes), whereas, demotion may effect a different set of other data objects (objects higher in the hierarchy or further from the leaf nodes). Therefore, depending on the action, some relationships may be important and others may not.

While this may sound simple, many objects may reference other objects. Therefore, deploying or demoting a data object may cause unintended complications that are undesired. For example, during deployment, the proxy object being deployed may refer to another data object that does not exist because it has previously been removed or never existed. Conversely, demoting a base or leaf node object may cause other consequences for compound objects that include the base or leaf node object.

All of the file, records, and objects within the current object may be thought of as nodes that constitute a graph and reference relationships are represented the arcs of the graph. The arcs may be thought of as being different colors for the different annotations for the various functions (e.g., deployment, demotion, etc.). CMS 160 can traverse the graph and return all the nodes that are encountered for a specific color of arcs. The order of execution for a set of nodes may be a function of the policy being used. Referential integrity constraints between the table for the peripheral row and the primary table of the referenced object may be examined. If there are integrity constraints that need to be enforced, CMS 160 takes that into account when doing the traversal. For deployment, the referenced object should precede the referring object in the ordering result that CMS 160 returns from the traversal.

In addition to logical relationships, physical dependencies may be important. If the order is followed, the integrity constraints in the database will not be violated. Referential integrity constraints in databases should be maintained and are most commonly typified by what are called foreign key-primary key constraints. For example, two different tables may be used. A referenced table has a primary key, and a referencing table has a foreign key with the value of the primary key in the referenced table. If rows are to be inserted into both tables, the referenced table gets its row before the referencing table gets its corresponding row. Performing the insertion in the reverse order violates the integrity restraints. In this manner, a user can describe the data, and CMS 160 will make sure that data gets shepherded properly from stage to stage. Such automation can allow almost any employee of a company to enter data and perform operations without having to address low-level programming concerns.

A similar concept may hold when objects are rendered or checked for validation depending upon the action to be taken. For example, Object 1 may reference Object 2, and Object 2 may reference Object 3. However, only one of those relationships is relevant to a deployment policy. Deployment of Object 1 may depend on Object 2. The fact that Object 1 references Object 3 may be irrelevant for the purposes of deployment. The policy controls which referenced objects should be operated on when performing a function, such as deployment.

Figure 7:
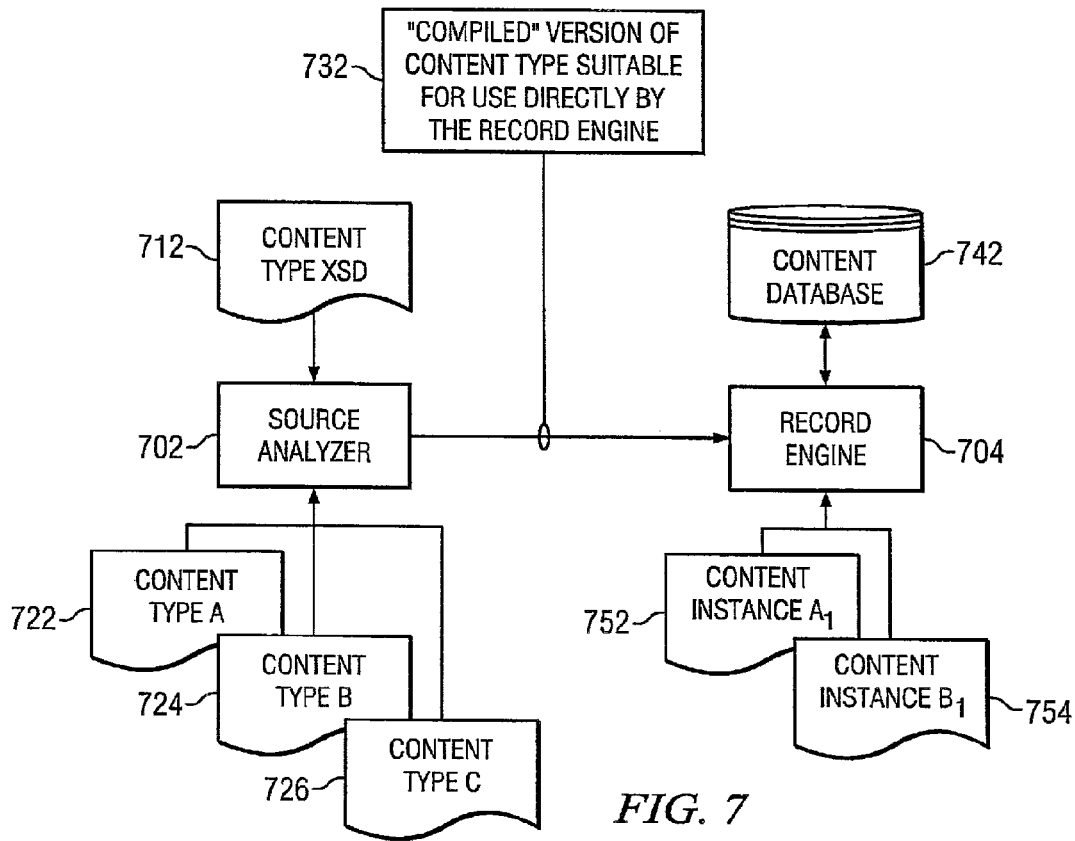
FIGS. 7-8 include process flow diagrams illustrating how content type definitions, content types, and content instances interact in generating content for a content database.
Figure 8:
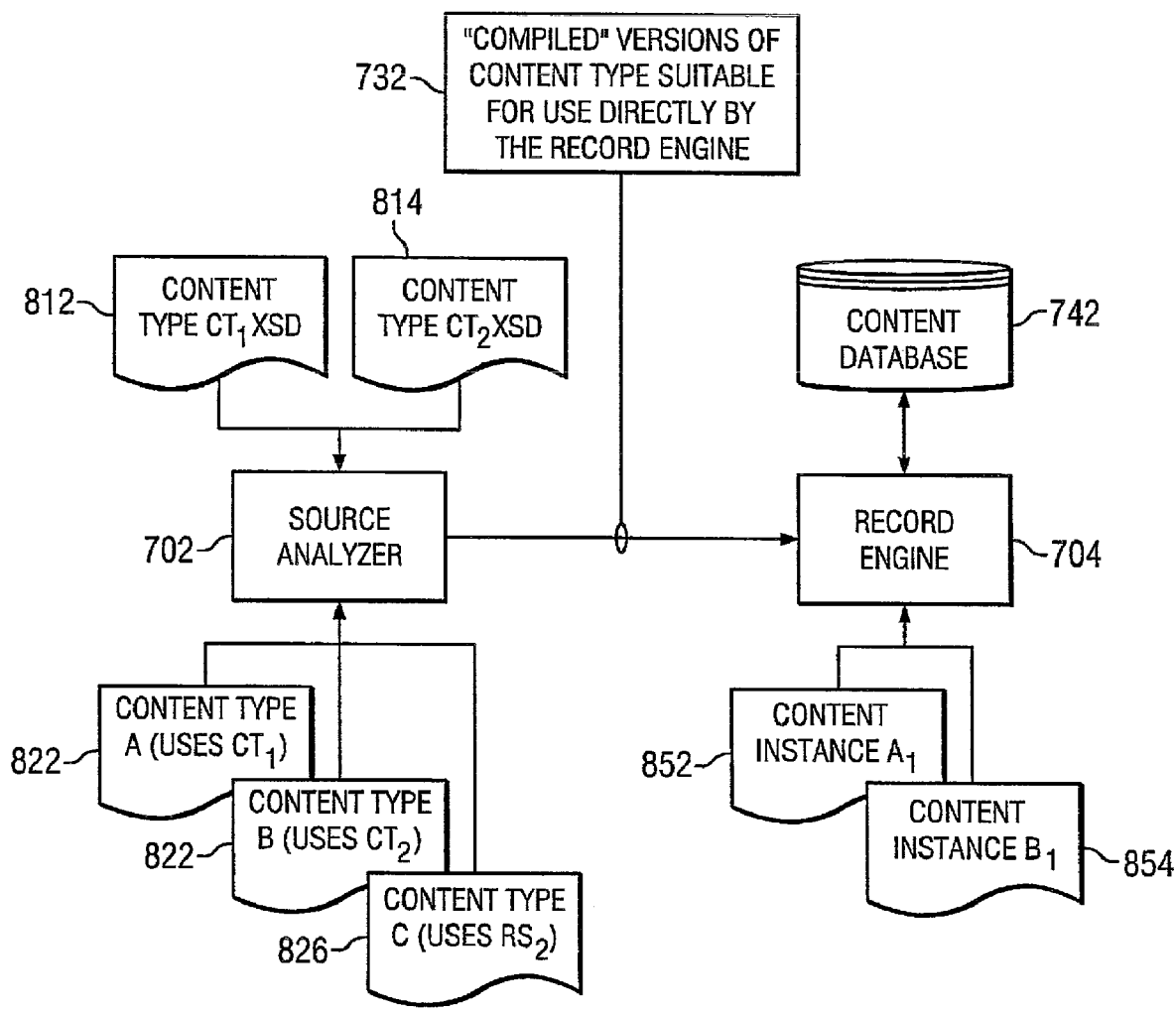

The method may comprise reading XML data for the content instances and the content types (block 522). Content types need to be registered with CMS 160. FIGS. 7 and 8 illustrates this operation. Source analyzer 702 can take content type XSD 712 and a content type (722, 724, or 726) as inputs. Content type XSD 712 can be used describing the content type. Source analyzer 702 can produce a content type that can be used by record engine 704. Alternatively, a compiled version of the content type definition 732 may be input directly in to record engine 704. Record engine 704 may take content instance 752 or 754 and its corresponding content type definition from source analyzer 702 or compiled version 732 to determine how content instances 752 and 754 are to be governed. The information may be output to content database 742 in accordance with the inputs to record engine 704. FIG. 8 has a similar representation for multiple content type XSD 812 and 814 having content types (822, 824, and 826) defined by those different schema files that govern content instances 852 and 854.

The method can include instantiating proxy objects (block 542). The proxy object can stand in for actual content. The proxy object may be used by an actor at actor computer 180 to access content within database 17 or 19 as managed by CMS 160.

Continuing with the article content type, a content contributor at actor computer 180 may instantiate an article proxy object using the article content type. CMS 160 can use the article content type XML file that was previously generated to determine what information the article proxy object will have (attributes), how to manage the article proxy object and potentially other information.

A variation can occur where the object already exists. For example, the CMS object may already exist but the data within the object needs to be changed. Creating a proxy object can be bypassed because the CMS object already exists. As used hereinafter, "current object" will refer to the proxy object or CMS object that is being generated.

The method can further comprise examining the data from the current object to infer relationships to records, files, and other objects needed by the current object (block 544 in FIG. 5). CMS 160 can determine what other objects, records, and files (all of which are managed by CMS 160) that the current object references to generate the relationship information in the form of a relationship table. FIG. 4 illustrates how a relationship between proxy objects can be inferred as previously described. For a database record, the content type may note which column in the relationship table has a foreign key for the record in the database table. For a file, the column in the relationship table may have a file path name for locating the referenced file. Similarly, the column could include references to other objects. After the examination, the relationship table can include relationships between the current object and all records, files, and objects used when rendering the current object. The relationship table may be cached for quick access during subsequent times.

Inferring relationships causes a significant usability improvement for people who are writing applications against the virtual content management. Existing applications that create and modify data in the content database need little or no modification. They can continue to work with the content tables just as they did before. If changes to the data are made, the application (or potentially another source) needs only tell CMS 160 which objects changed. CMS160 can recompute all of the reference relationships it needs to. This can free the application from needing to know exactly what relations might be involved, which in turn means that the application programmer does not need to know all of those references (or modify the program if new reference definitions are introduced).

Referring to the article embodiment, CMS 160 can use the article content type and article proxy object to determine the relationship between the article proxy object and its constituent data objects (title, author, image, and text). The title, image, and text may be data objects that do not refer to any other objects, and therefore, are at leaf node positions. The author may be an object that references a record within database 17 or 19. The record within the database may be a leaf node, with the author object being a parent node to the record, and the article proxy object being the parent node to the title, author, image, and text data.

The method can also comprise determining an order in which actions are to be taken based upon on physical dependencies (block 604). The determination may be made by analyzing the annotated policy information previously described. Actions should be performed in an order so that a validation checking software component should not encounter an invalid situation (e.g., a reference to a record that does not yet exist). The physical dependency determination helps to ensure that the information of lower-level data (referenced data) exists before the testing and validation of a higher-level object (referencing object) begins.

The method can still further include performing the action on the affected objects, records, and files based on the physical dependency ordering (block 606). The physical dependency ordering can be used to a reduced likelihood of generating errors for non-existent information or violating validation checks.

Embodiments described herein allow a new solution for content management to be used that is "backwards compatible." in other words, the content management solution can be implemented without having to write new applications or having to edit existing applications. Also, the content management solution does not require any existing content data to be changed. Therefore, the solution may be integrated into an existing network site is more of a seamless fashion compared to conventional content management system.

Embodiments may allow for better control and management of content at a network site. All objects, records, and files that comprise another object may be examined for inconsistencies between referenced data or other consequences before action is taken.

The foregoing specification has been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:

1. A method for object based content management, comprising:
   inferring what reference relationships an object has with content data that is referenced by or that references the object, wherein the inferring is performed by a computer implementing a content management system in a network environment, and wherein the object and the content data reside in separate tables, the content management system having access to the separate tables over one or more network connections;
   traversing the inferred reference relationships of the object to determine an order of execution as a function of a predefined policy associated with an action, wherein the predefined policy includes rules for acting on the content data that is referenced by or that references the object; and
   performing the action on the object and the content data that is referenced by or that references the object in accordance with the order of execution.

2. The method according to claim 1, wherein the performing the action comprises deploying the object.

3. The method according to claim 1, wherein the performing the action comprises demoting the object.

4. The method according to claim 1, further comprising determining which, if any, of the inferred reference relationships of the object is significant.

5. The method according to claim 1, further comprising defining content types in the content management system.

6. The method according to claim 5, wherein the defining the content types in the content management system further comprises annotating policy information.

7. The method according to claim 6, wherein the traversing the inferred reference relationships of the object further comprises utilizing the annotated policy information.

8. The method according to claim 5, wherein the defining the content types further comprises defining relationships between the object and the content data that is referenced by or references the object.

9. The method according to claim 5, wherein the defining the content types further comprises:
   generating a base content type; and
   generating a composite content type using the generated base content type.

10. The method according to claim 1, further comprising reading a file that matches a content type of the object to determine which, if any, relationships are relevant to the object.

11. A computer program product comprising at least one non-transitory data processing system readable storage medium storing instructions translatable by a computer to perform:
   inferring what reference relationships an object has with content data that is referenced by or that references the object, wherein the computer implements a content management system in a network environment, and wherein the object and the content data reside in separate tables, the content management system having access to the separate tables over one or more network connections;
   traversing the inferred reference relationships of the object to determine an order of execution as a function of a predefined policy associated with an action, wherein the predefined policy includes rules for acting on the content data that is referenced by or that references the object; and performing the action on the object and the content data that is referenced by or that references the object in accordance with the order of execution.

12. The computer program product according to claim 11, wherein the performing the action comprises deploying the object.

13. The computer program product according to claim 11, wherein the performing the action comprises demoting the object.

14. The computer program product according to claim 11, wherein the at least one non-transitory data processing system readable storage medium further stores an instruction translatable by the computer to perform determining which, if any, of the inferred reference relationships of the object is significant.

15. The computer program product according to claim 11, wherein the at least one non-transitory data processing system readable storage medium further stores an instruction translatable by the computer to perform defining content types in the content management system.

16. The computer program product according to claim 15, wherein the defining the content types in the content management system further comprises annotating policy information.

17. The computer program product according to claim 16, wherein the traversing the inferred reference relationships of the object further comprises utilizing the annotated policy information.

18. The computer program product according to claim 11, wherein the at least one non-transitory data processing system readable storage medium further stores an instruction translatable by the computer to perform defining relationships between the object and the content data that is referenced by or references the object.

19. The computer program product according to claim 11, wherein the at least one non-transitory data processing system readable storage medium further stores instructions translatable by the computer to perform:
generating a base content type; and
generating a composite content type using the generated base content type.

20. The computer program product according to claim 11, wherein the at least one non-transitory data processing system readable storage medium further stores an instruction translatable by the computer to perform reading a file that matches a content type of the object to determine which, if any, relationships are relevant to the object.

* * * * *